Feb. 18, 1964   M. C. GIEBEL ETAL   3,121,400
MACHINE FOR APPLYING RAIL ANCHORS
Filed Feb. 10, 1960   7 Sheets-Sheet 1

INVENTORS:
MILTON C. GIEBEL
ROLAND G. SPECK
By Sutherland, Polster and Taylor
ATTORNEYS.

Feb. 18, 1964  M. C. GIEBEL ETAL  3,121,400
MACHINE FOR APPLYING RAIL ANCHORS
Filed Feb. 10, 1960  7 Sheets-Sheet 2
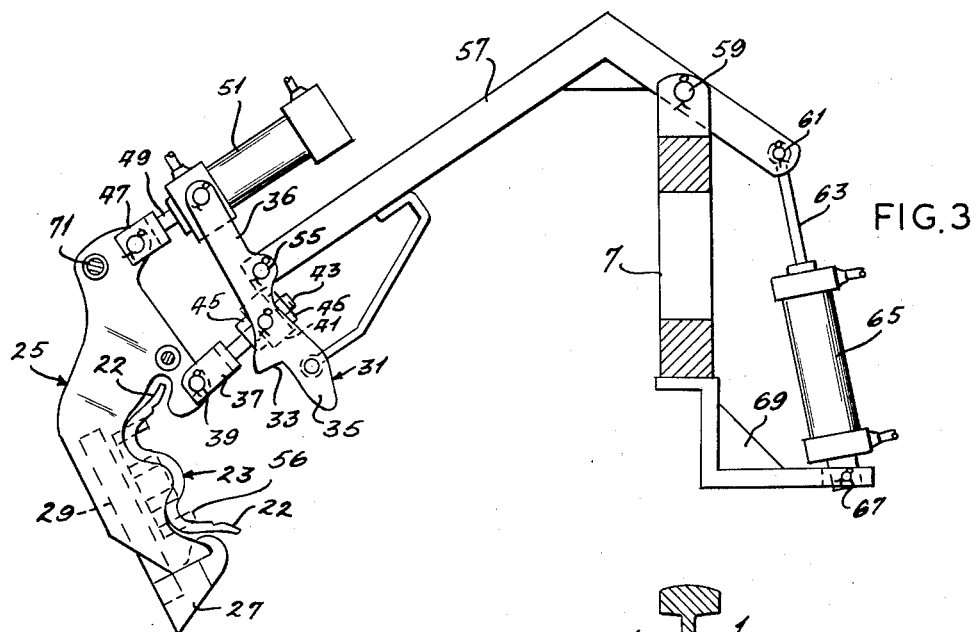
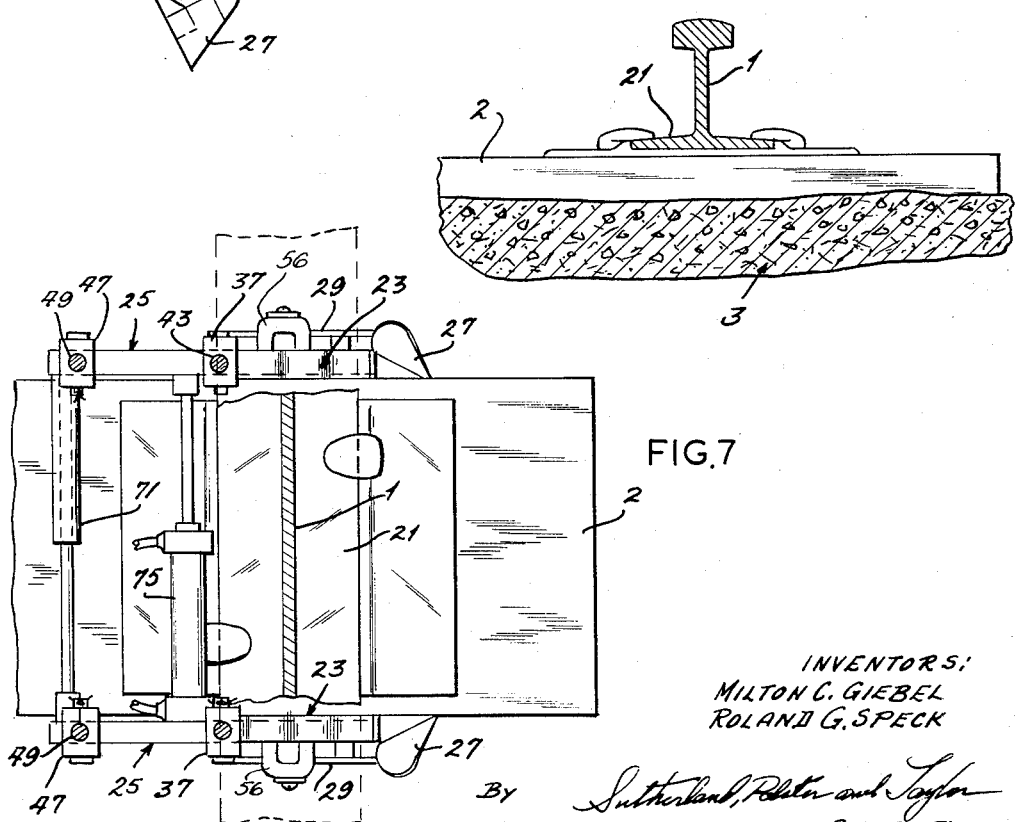
INVENTORS:
MILTON C. GIEBEL
ROLAND G. SPECK
ATTORNEYS.

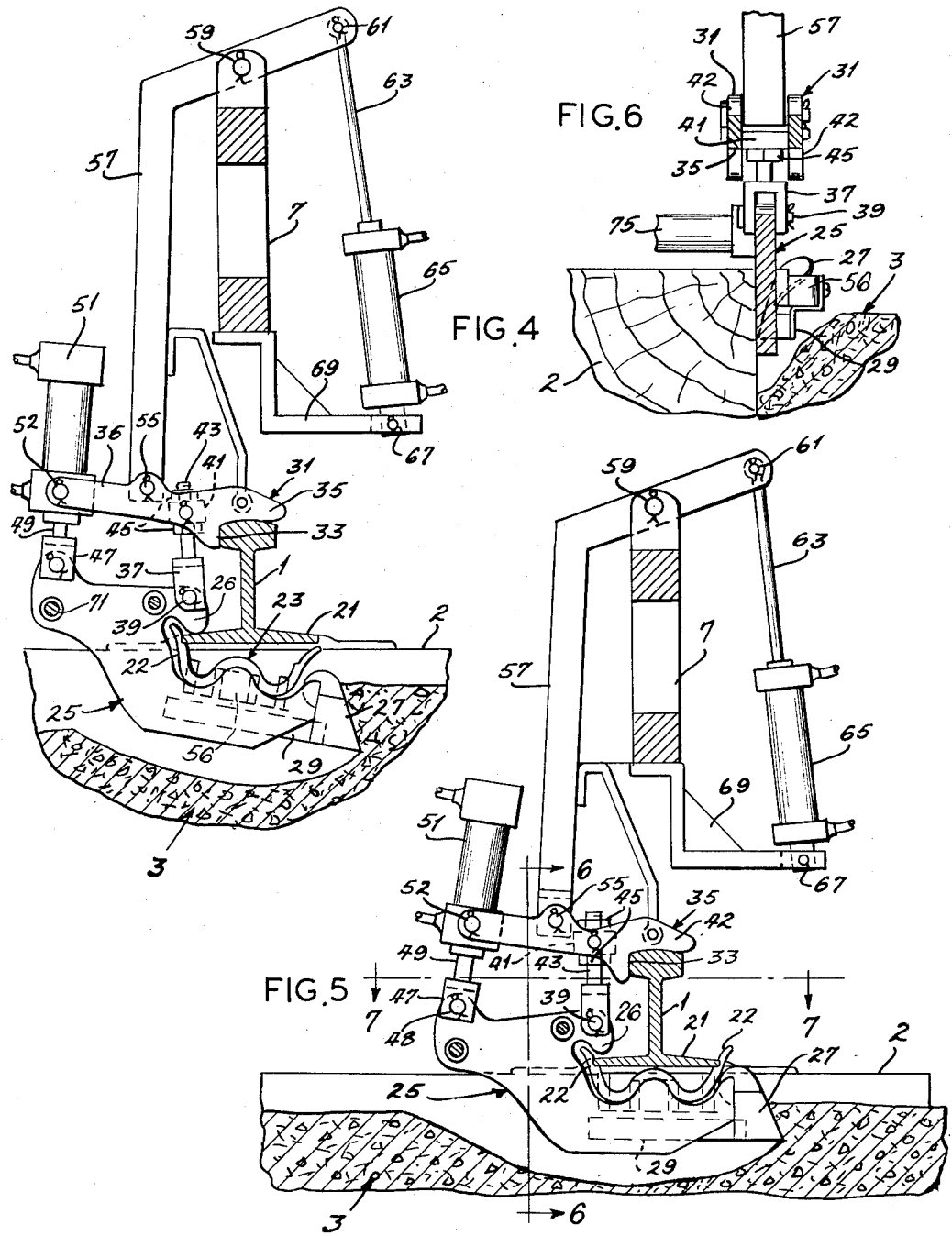

Feb. 18, 1964   M. C. GIEBEL ETAL   3,121,400
MACHINE FOR APPLYING RAIL ANCHORS
Filed Feb. 10, 1960   7 Sheets-Sheet 4

INVENTORS:
MILTON C. GIEBEL
ROLAND G. SPECK

BY Sutherland, Polster and Taylor
ATTORNEYS.

Feb. 18, 1964 M. C. GIEBEL ETAL 3,121,400
MACHINE FOR APPLYING RAIL ANCHORS
Filed Feb. 10, 1960 7 Sheets-Sheet 5

INVENTORS.
MILTON C. GIEBEL
ROLAND G. SPECK
BY Sutherland, Polster and Taylor
ATTORNEYS.

Feb. 18, 1964     M. C. GIEBEL ETAL     3,121,400
MACHINE FOR APPLYING RAIL ANCHORS
Filed Feb. 10, 1960     7 Sheets-Sheet 6
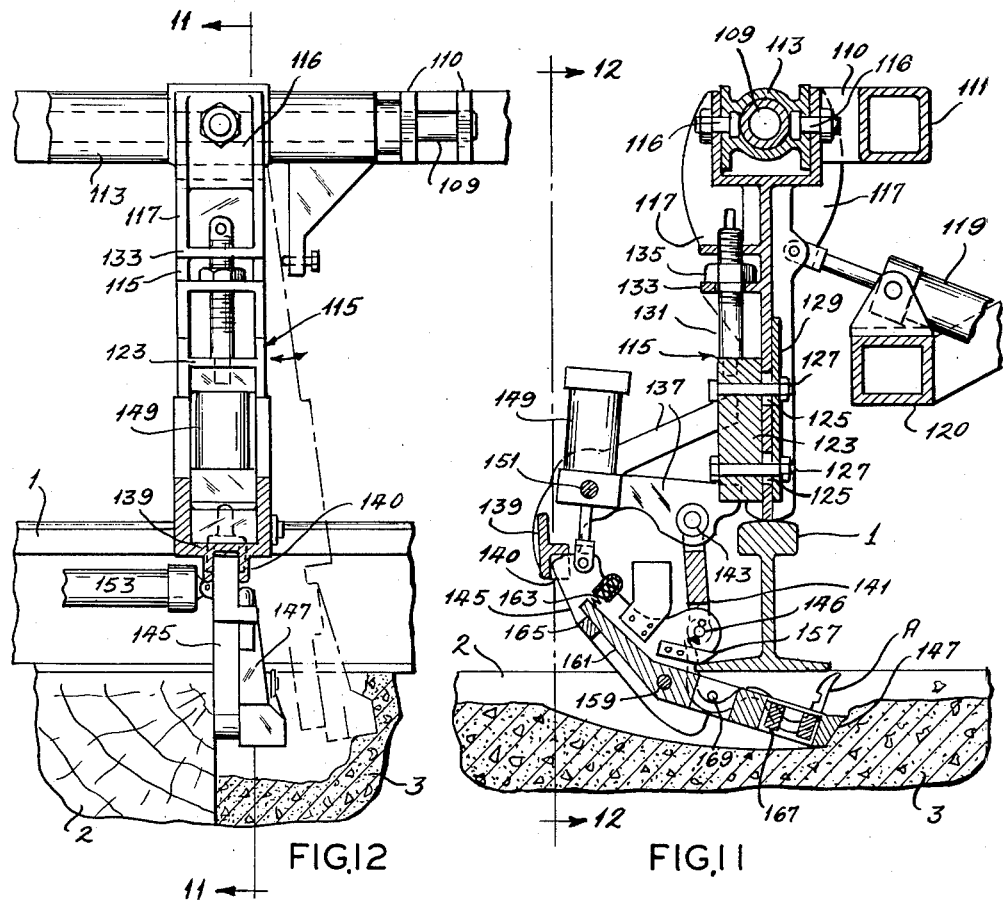
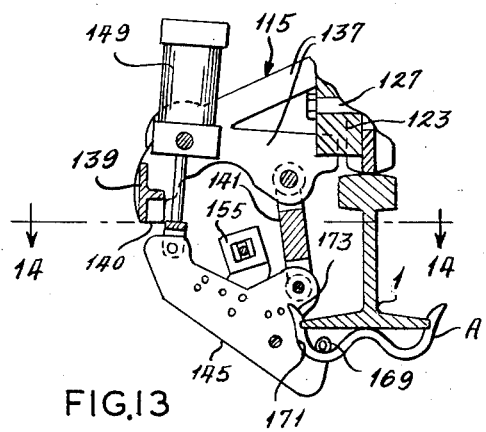
INVENTOR:
MILTON C. GIEBEL
ROLAND G. SPECK
BY Sutherland, Polster and Taylor
ATTORNEYS.

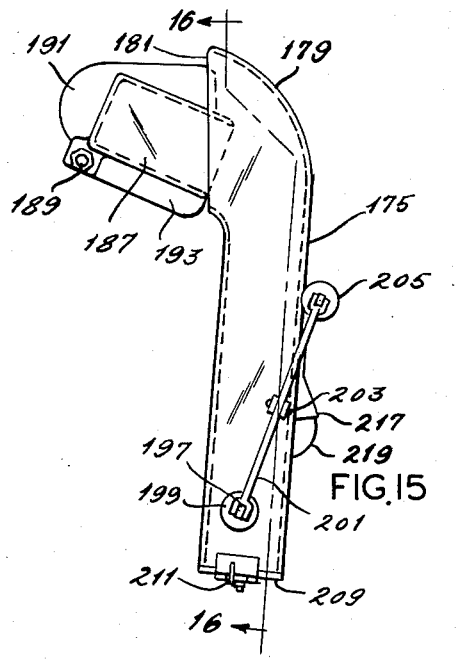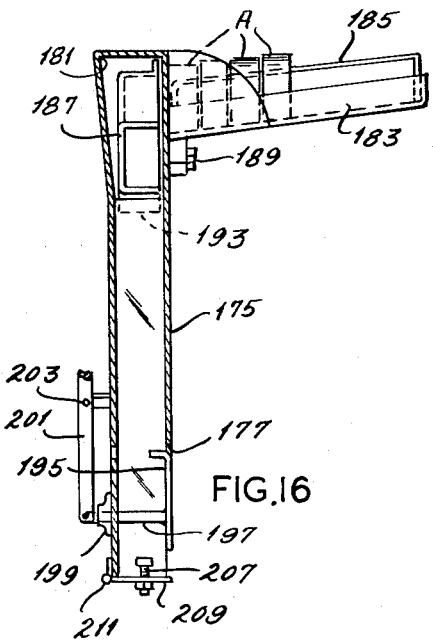

United States Patent Office 3,121,400
Patented Feb. 18, 1964

3,121,400
MACHINE FOR APPLYING RAIL ANCHORS
Milton C. Giebel, Webster Groves, and Roland G. Speck, St. Louis, Mo., assignors to Achuff Railway Supply Company, St. Louis, Mo., a corporation of Missouri
Filed Feb. 10, 1960, Ser. No. 7,939
4 Claims. (Cl. 104—2)

This invention relates to apparatus for and methods of applying rail anchors to a railroad track.

It will be understood that rail anchors are clamped to the bottom of a rail adjacent a cross tie in order to prevent or minimize longitudinal movement of the rail. Such anchors may be applied manually, usually with a leverage tool for pushing the anchor upwardly onto the bottom flange of the rail. A more convenient and economical method of applying rail anchors, however, is to utilize a machine which may travel along the track and which is adapted to apply the anchors with a minimum degree of manual labor.

Accordingly, the present disclosure is directed to such a machine, and particularly to a machine for applying W-shaped rail anchors. The machine is characterized by the presence of an anchor holder (or a spaced pair of holders), the holder being adapted for movement from a retracted position clear of the rail (and in which the anchor is inserted) to an advanced position beneath the rail. The advance and retraction of the anchor holder is under control of a first power unit, and a ballast plow may be mounted on the front of the holding element to clear a path through the ballast for the anchor.

The holder is further adapted for horizontal movement beneath the rail toward and away from the cross tie, and a second power unit is connected to the holder so as to urge the anchor carried thereby against the side of the cross tie, prior to application of the anchor to the rail. Finally, the holder is movable vertically, a third power means being provided to lift the holder and thereby push the W-shaped anchor onto the bottom flange of the rail. The notched legs of the anchor are initially deflected by the margins of the rail, and as the anchor moves upwardly, the notches in the legs snap over the margins of the rail bottom flange. Preferably, a rail gripper is associated with the anchor holder for advance toward and retraction away from the rail and for clamping engagement with the top of the rail. As the anchor-holding and rail-gripping members are advanced toward the rail, a part thereof engages a side of the rail, whereupon the anchor becomes centered therebeneath. The gripper then holds the top of the rail as the anchor is pushed upwardly from below.

Other features of the invention will be in part apparent from and in part pointed out in the following detail description taken in connection with the accompanying drawings, in which:

FIG. 3 is a vertical cross-sectional view illustrating details of the anchor-applying apparatus, the anchor-holder and rail-gripper being in their retracted positions;

FIG. 4 is a view similar to FIG. 3 but with the anchor-holder and rail-gripper in their advanced positions;

FIG. 5 is a view similar to FIG. 4 with the anchor-holder and rail-gripper in their advanced positions and with the anchor-holder further moved upwardly to apply the anchor;

FIG. 6 is a detail sectional view taken generally on the line 6—6 of FIG. 5;

FIG. 7 is a sectional view taken generally on the line 7—7 of FIG. 5;

FIG. 11 is a view similar to FIG. 10 taken on the line 11—11 of FIG. 12 and showing the mechanism advanced to position an anchor beneath a rail;

FIG. 12 is a view of the apparatus taken on the line 12—12 of FIG. 11;

FIG. 13 is a detail view similar to FIG. 11, but with the anchor applied to the rail, parts being broken away;

FIG. 15 is a side view illustrating a rail-anchor magazine adapted to be used with the apparatus in FIGS. 8–14; and FIG. 16 is a section taken on the line 16—16 of FIG. 15.

Figure 1:
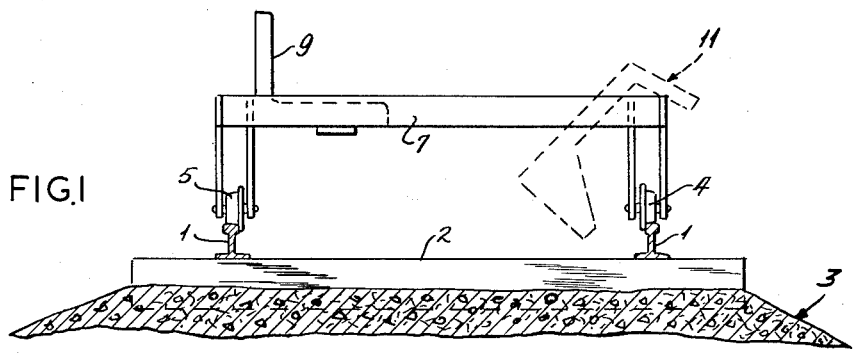
FIG. 1 is a side elevation of a track cart on which the anchor-applying apparatus of this invention may be mounted.
Figure 2:
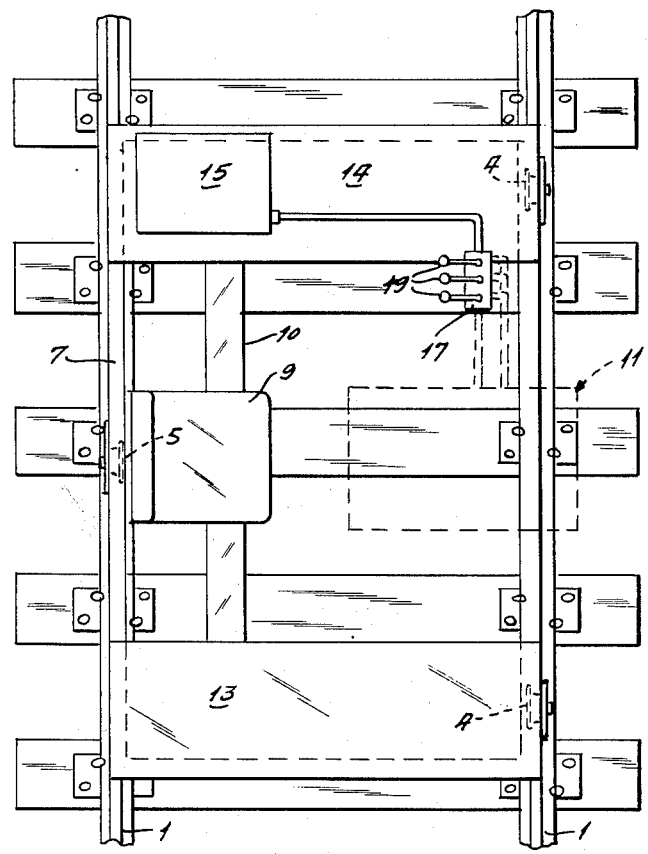
FIG. 2 is a top plan view of the cart, the apparatus being indicated by a box in dotted lines.
Figure 8:
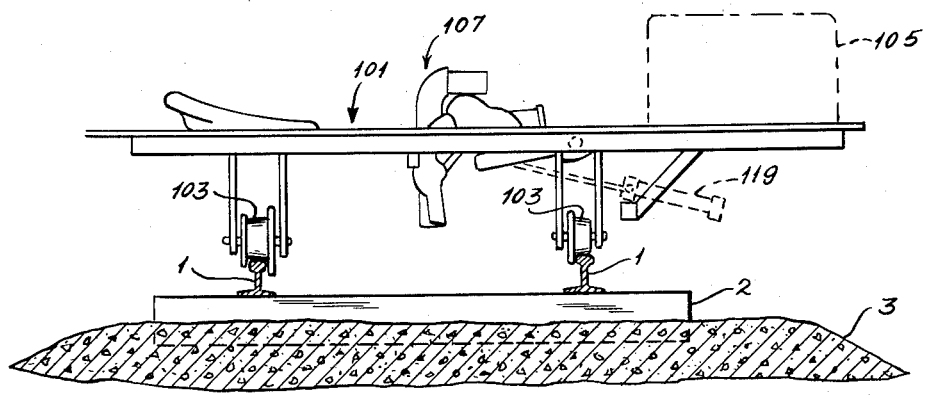
FIG. 8 is a side elevation similar to FIG. 1, but showing another type of machine.
Figure 9:
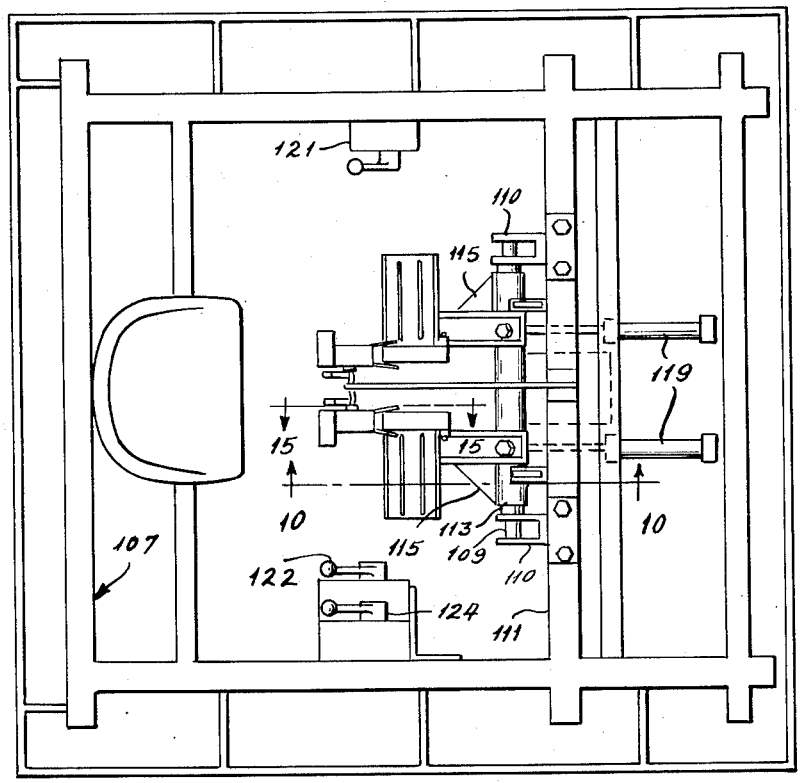
FIG. 9 is a top plan view of the machine shown in FIG. 8, parts being broken away.

Referring to the drawings, the apparatus of this invention is adapted to be mounted upon a track cart shown in FIGS. 1 and 2, so that the apparatus can be readily pushed along the track. The track is shown to have rails 1 secured to cross ties 2 which rest on a ballast bed 3. The cart has a pair of wheels 4 riding on one of the rails and a center wheel 5 riding on the other rail. The wheels support a rectangular frame 7, and an operator seat 9 is located in the center of the cart adjacent the wheel 5, the seat being supported upon a cross frame member 10. The anchor-applying apparatus, generally designated by the box 11 is located opposite the seat 9, space being provided on opposite sides thereof for the operator's legs and feet, so that he can thereby maneuver the cart along the track and center it with respect to one of the cross ties 2 or with respect to the space between the ties, depending upon whether the anchors are applied on opposite sides of a single cross tie or on opposite sides of the space between cross ties.

Panels 13 and 14 are mounted on the cart at opposite ends thereof, the panel 14 carrying a hydraulic pumping unit generally designated 15, which might be driven by an internal combustion engine (not shown). A supply of rail anchors may be carried on the other panel 13. FIG. 2 also illustrates a hydraulic control valve mechanism 17 having three control handles 19 for controlling three hydraulic power units (or sets thereof) to be described.

Referring now to FIGS. 3–7, the rail is shown to have a bottom flange 21 onto which a W-shaped anchor 23 is applied. This anchor has upwardly extending notched legs 22 for engaging opposite side margins of the bottom flange 21 with considerable force, so that the rail is tightly gripped by the anchor. The anchor, in turn, is adapted to engage against one side of a cross tie, thereby acting as a means for preventing longitudinal movement of the rail.

The anchor is initially placed within a holder 25 having a front ballast plow 27 secured thereon by a leaf-spring 29. The anchor holding member, in turn, is supported from a pair of rail-gripping members generally designated 31 each having a front rail-side-engaging shoulder 33 and a rail-gripping extension 35. A clevis 37 is pivotally connected at 39 to the upper front portion or aligning member 26 of the holder 25, the clevis extending upwardly at 43 through a block 41 carried by and between the rail grippers 31. The fit of the upwardly projecting portion 43 of the clevis 39 is somewhat loose with respect to the opening therefor in the block 41, so that the clevis has a limited degree of relative movement. Adjusting nuts 45 permit vertical adjustment of the clevis 37 with respect to the rail gripper 35.

Both the anchor holder and rail gripper project rearwardly and a second clevis 47 is pivotally connected at 48 to the back top portion of the holding plate 25. This second clevis 47 is attached to a piston rod 49 of a hydraulic power 51, which power unit is pivotally supported at 52 on and between the back portions 36 of the rail-grippers. The gripper arms are further supported, in turn, at pivoted sections 55 from a swing frame member 57, which extend upwardly and over frame parts 7 of the cart. The upper portion of the swing frame 57 is pivotally connected at 59 to the frame, and continues forwardly for connection at pivot 61 to a piston rod 63 of a second hydraulic power unit 65. This unit 65 is pivotally connected at 67 to a supporting bracket 69, which bracket is attached to the main frame members 7.

The invention, in its preferred form, has a pair of anchor-holding members 25, thereby to permit the application of a pair of anchors during each cycle of the machine. The two anchor-holding plates 25 are in horizontally-spaced generally vertical planes and are so held at their back ends by an adjustable cross brace 71. This cross brace may be a two-part screw assembly such that it can be extended or shortened, as desired. The upper front portions of the two anchor-holding plates are then interconnected by means of a third hydraulic power unit 75, so that the front ends of the respective anchor-holders may be moved toward and away from one another.

It will be understood that each anchor-holding element has its associated rail-grippers 31, clevises 37 and 47, and power unit 51. All power units are of a double-action type, and the associated valves are of the three position type for advancing, retracting or stopping the power units.

In operation, the control valves are initially set so that power unit 65 is retracted to swing the anchor-holders rearwardly and upwardly to a position adjacent the operator. In this position, the rail-anchors 23 are readily inserted by the operator, where they are held, as by magnets 56. The power unit 51 is also retracted so as to depress the forward portions of the anchor holders relative to the associated rail-grippers, so that the associated anchors may swing beneath the rail. If the anchors are to be applied on opposite sides of a single cross tie so as to "buck" the tie, the power unit 75 is initially advanced so as to swing the two anchor holders outwardly a slight distance clear of the cross tie, over which the cart and apparatus have been centered by the operator. On the other hand, if the anchors are to be applied to the space between the cross tie so as to "buck" the "crib," then the power unit 75 is initially retracted so that the two anchor holders will be drawn inwardly to clear the cross ties.

As an initial step in the cycle, the control valve for power unit 65 is manipulated to advance or extend this power unit, thereby causing the swing frame 57 and anchor-holders 25 to be swung inwardly and carry the anchors into position beneath the rail. The associated ballast plows 27 serve to displace the ballast and clear a path during the advance of the anchor-holders, and at the same time, the front shoulders 33 of the rail-grippers move into engagement with the upper side part of the rail. It will be noted that the forward portion of the rail-gripper is adapted to engage both top and side portions of the rail, the latter side engagement thereby centering the anchor beneath the rail. It will further be understood that the hydraulic pump unit or the hydraulic line to the power unit 65 may have an adjustable relief valve and return line so that the pressure developed by unit 65 is of a predetermined maximum value. Such apparatus is known in the hydraulic power art, hence is not further described.

Next, the power unit 75 is actuated to draw the two anchors into pressure engagement with the sides of a cross tie or cross ties, depending upon the method by which the anchors are applied. Of course, the cart has been centered with respect to the cross tie or with respect to the space between the cross ties, depending upon which practice is being followed, and this practice varies with different railroads.

Next, the power units 51 are advanced so as to tilt the front end portions of the anchor-holders upwardly and push the anchors onto the rail. The anchor-holders are provided about the axes 39 by the power units 51 and associated clevises 47. The power units 51, 75 and 65 are then actuated in the opposite direction in the order mentioned to return the apparatus to its initial position preparatory to a second cycle, the cart then being moved along the track to the next position at which anchors are to be applied. In operating the power units, there may be three separate manual valves which are manipulated in proper order by the operator, or there may be a single multiple-position valve which may actuate the units in proper sequence. It will be understood that the power units 51 and 75 may also be provided with pressure-relief valves and return line mechanism, which apparatus is known in the hydraulic power art, and is not further described here.

Referring now to FIGS. 8–16, there is shown another machine for applying rail anchors. A frame 101 is mounted on track wheels 103 to ride along rails 1 on cross ties 2 and a ballast bed 3. It will be understood that there may be three or four track wheels, and if desired, the frame may also be provided with retractable rubber-tire wheels for moving the machine over a conventional road. A hydraulic pump and internal combustion engine unit (diagrammatically shown at 105) is mounted at the front of the frame to supply hydraulic fluid for certain power units to be described. The above details are not further described or illustrated, since they may be of a conventional character. The invention is particularly directed to the mechanism, generally designated 107, for positioning and applying rail anchors A to one of the rails.

A shaft 109 is supported by brackets 110 from a part 111 of the frame to extend generally parallel to and above one of the rails. A sleeve 113 is rotatably received on the shaft, and a pair of anchor-positioning arms 115 extend from the sleeve. The arms 115 are pivotally supported at 116 by clevises 117, so that the arms may be moved toward and away from one another as well as between the retracted and advanced positions of FIGS. 10 and 11, respectively. Hydraulic power units 119, supported upon a part 120 of the frame, are connected to each arm 115, thereby to control the movement of the arms 115 between their retracted and advanced positions. The power units 119 correspond to the unit 65 of the previous embodiment and are operated by a controlled valve shown at 121 in FIG. 9.

Each arm 115 is of a generally I-shaped cross section, and an anchor-positioning block 123 (FIG. 11) is mounted for sliding movement on one side of the center web of the arm. Elongate openings 125 in the center web accommodate stepped bolts 127, which extend through the block 123 and a back plate 129, thereby to hold the block 123 upon the arm while permitting limited movement therealong. A screw 131 is secured in the upper portion of the block 123 to project upwardly therefrom through a bracket 133 secured to the arm 115 and through the base of the clevis 117. An adjusting nut 135 is threaded onto the screw 131 above the bracket 133 to permit elevation of the block 123 (and associated mechanism), this adjustment being made in accordance with the height of the rail. The space between the bracket 133 and clevis is greater than the thickness of the nut 135, however, thereby permitting limited upward motion of the block and some self-adjustment of the apparatus, as will be apparent, so as to accommodate rail wear. The length of the arm 115 is such that its end will engage with the top of the rail when moved to the advanced positions of FIG. 11, but the anchor holding parts are adjustable toward or away from the axis 109 by nut 135, in order to account for rail size variations and rail wear.

Spaced supports 137 are cantilevered outwardly from opposite sides of the positioning block 123 and are secured together by a cross web 139 at the outer ends thereof. A shoe-supporting link 141, pivotally supported at 143, depends from the inner end of the supports 137, and an anchor applying shoe 145 is pivotally secured at its forward end 146 upon the link. The anchor A fits within the forward end of the shoe 145 and is further releasably held by an anchor holder 147 projecting forwardly from the shoe. The back end of the shoe 145 is normally adapted to seat against the web 139 between guides 140, but is also connected to a power unit 149. The power unit 149 is pivotally supported at 151 between the supports 137, and is adapted to rock the shoe about its pivot 146 when the anchor is to be applied to the rail. Accordingly, the power unit 149 corresponds to the power unit 51 of the previous embodiment. As in the previous embodiment, another power unit 153 (FIGS. 12 and 14) extends between the two shoes 145, its purpose being to move the rail anchors tightly against the sides of a cross tie (or cross ties) after the anchors have been advanced to positions beneath the rail. The power unit 153 is connected directly to the shoes 145 by universal connections 155. The movement of the shoes toward and away from one another is accommodated by the clevises 117 pivotally supported at 116 on the sleeve 113.

As a shoe is advanced toward the rail, an associated guide or aligning member 157 engages with the rail base (as indicated in FIG. 11) so as to align one end of the anchor with the adjacent edge of the rail. This guide 157 is formed with an inclined front surface such that it may elevate the mechanism a slight distance, in the event that the adjustment at 135 is not precise.

The anchor-holding member 147 is pivotally supported at 159, and the back portion 161 of the holder is spring biased downwardly at 163 against a stop 165. Accordingly, the front of the holder has limited downward movement with respect to the shoe 145. This is desirable because if a rock jams between the holder 147 and rail, the holder will not prevent the shoe from being rocked by unit 149. The anchor is held by means of a U-shaped permanent magnet 167 at the front of the holder and by a flexible finger 169 near the back of the holder. The finger 169 may be formed as a spring with a pointed cap, so as to extend over the loop of the anchor and press the anchor against the shoe. The shoe 145 is formed with a recessed portion 171, which fits one side of the anchor. The upper end of the anchor is then held within a notch 173 (FIG. 13) in the shoe. The arrangement of the notch 173 and recess 171 is such that the shoe 145 grips the anchor when moving it upwardly onto the rail as power unit 149 is advanced (FIG. 13). After application of the anchor, the power unit 149 is first retracted, the power unit 153 is then actuated to move the shoe 145 and holder 147 laterally clear of the anchor, and the unit 119 is finally retracted to the FIG. 10 position. The holder 147 serves to hold the anchor against displacement from the shoe as the anchor is moved into position beneath the rail and serves to press the anchor against the cross tie when power unit 153 is actuated.

Figure 10:
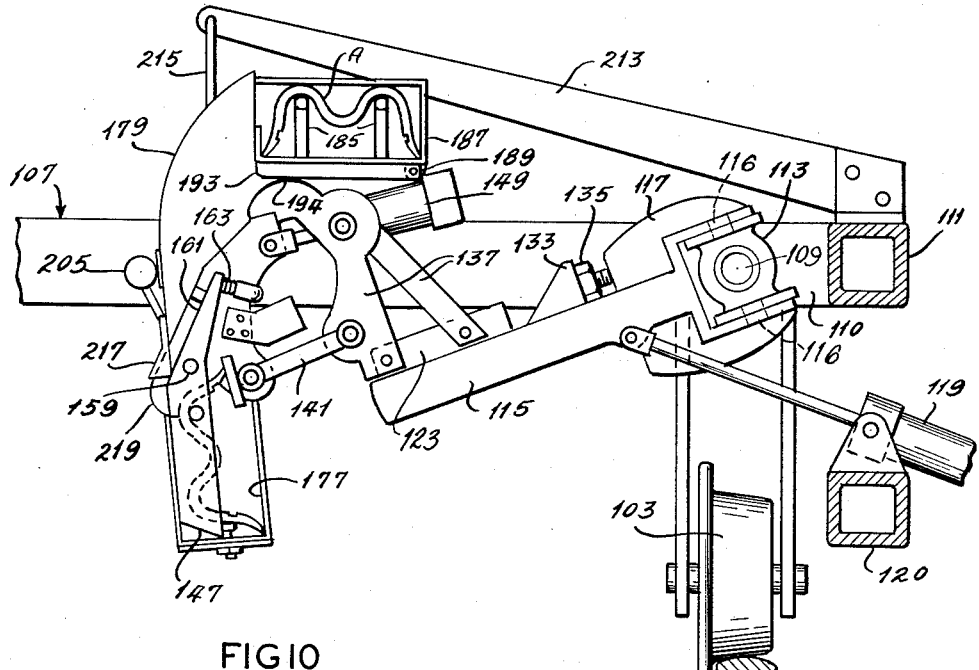
FIG. 10 is an enlarged vertical section taken generally on the line 10—10 of FIG. 9 and showing the rail-applying mechanism in its retracted position.
Figure 14:
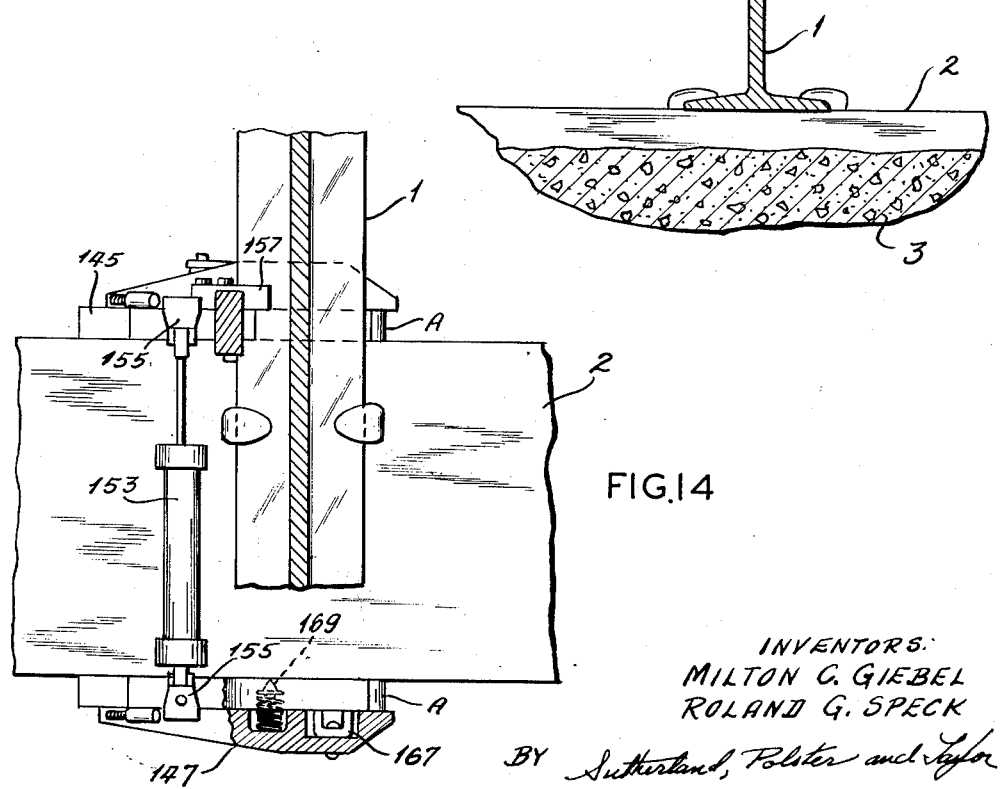
FIG. 14 is a detail top section taken generally on the line 14—14 of FIG. 13, parts being broken away.

Referring now to FIGS. 10, 15 and 16, there is shown a magazine for use with the machine, a separate magazine being provided for each of the anchor-positioning and applying devices. The magazine includes a generally vertical chute 175 having a discharge opening 177 at its lower end. The chute is mounted so that the discharge opening is opposite the inner side of the anchor-holder 147, when the mechanism is in the retracted position of FIG. 10. The upper portion of the chute has a curved section 179 opening at 181 toward the front of the machine (as shown in FIG. 10). The anchors A are accumulated in a row upon a rack formed by a tray 183 and rails 185, the anchors being inverted. The rack is fixed to the chute opposite the opening 181 and is inclined outwardly to one side of the machine.

The anchors are fed individually in timed sequence from the rack into the chute by means of a pocket-type separator 187 pivotally supported at 189 from the rack. The separator 187 opens at one side toward the rack and at one end toward the chute 181, but otherwise is closed. An upper flanged portion 191 adjacent the rack holds the anchors on the rack when the separator is in its lower position (FIG. 15) and a similar lower flanged portion 193 is adapted to be engaged at 194 by one of the supports 137, thereby to lift the separator when the mechanism is retracted, as shown in FIG. 10. As the mechanism is retracted, engagement of the support 137 with the flange 193 lifts the selector to a generally horizontal upper position (FIG. 10) such that one of the anchors on the rank may enter the pocket. When the mechanism is then advanced toward the rail, the separator drops to its lower tilted position (FIG. 15) to discharge the anchor from the pocket into the chute.

An anchor-discharge pusher 195 is mounted within the chute opposite the lower discharge opening 177, the pusher being supported upon a rod 197, which is slidably received within a bearing 199. A lever 201 pivotally supported from the chute at 203 is connected at one end to the rod 197 and at its other end to a small hydraulic power unit 205 mounted on the back of the chute. The power unit 205 is preferably operated by a cam-actuated valve (not shown), the cam of which is mounted upon the sleeve 113 so as to be responsive to the position of the anchor-positioning mechanism. The arrangement is such that the pusher 195 is normally advanced (FIG. 16) so as to intercept an anchor falling downwardly within the chute. The anchor-pusher 195 is retracted automatically when the anchor-positioning mechanism approaches its fully retracted position (but before reaching the fully retracted position), thereby permitting the anchor in the chute to drop down upon an adjustable stop 207 in the bottom wall 209 of the chute. This bottom wall may be hinged and spring biased at 211 to a closed position, such being desirable to facilitate clearing a jam.

The separator 187 is then in the upward position closing the rack from the chute. As the positioning mechanism reaches its upper position, the hydraulic unit 205 is again actuated to advance the pusher, thereby displacing the anchor from the chute into the shoe, where it is held by the holder 145. In the fully retracted position, the shoe and chute are automatically aligned with the discharge opening of the magazine.

This may be conveniently accomplished by suspending the magazine from an arm 213 (FIG. 10) on a flexible element 215 so that the magazine has limited vertical movement. A shoe horn 217 is mounted at the back of the magazine to cooperate with the outer end 219 of the shoe 145, as the latter is retracted. When the shoe is retracted into the pocekt 217, it picks up the magazine, thereby automatically assuring alignment with the two portions. The lower portion of the magazine may also be suitably supported for such limited vertical movement by means (not shown), such as an arm pivotally connected to the magazine and to the frame at a point adjacent the axis 109 of rotation for the anchor-positioning mechanism. The magazine, shoe and anchor-holder are each designed to accommodate anchors of varying size, so that the machine may be used to apply several sizes of anchors.

The machine can be moved along the track by the operator pushing with his feet against the cross ties. The center of the machine is aligned with a cross tie preparatory to applying the anchors to opposite sides of the tie, or the center of the machine may be aligned with a space between two cross ties where anchors are applied to opposed ties. If desired, a hydraulic motor may be incorporated to provide for a self-propelled machine. It will be apparent that this motor may be under control of valves, which are automatically operated by engagement of suitable detecting elements with the cross ties, thereby automatically to position the machine preparatory to applying the anchors. Also, the machine may be designed for more complete automatic control. In the illustrated embodiment, there are three manual control valves 121, 122 and 124 (FIG. 9) for manually controlling the power units 119, 153 and 149, respectively. Since the above power units operate in a predetermined sequence, however, cam-actuated valves may also be utilized, if desired. If may also be preferable to incorporate safety valves, which will insure the proper sequence of operation. For example, after the anchor is applied, the anchor-applying units should be moved out from the cross tie and down from the rail by power units 149 and 153, before retracting the mechanism preparatory to inserting new anchors.

From the foregoing description, it is apparent that those skilled in the art will understand the structure, function and mode of operation of the invention herein disclosed, and appreciate the advantages thereof. Although one embodiment has been disclosed in detail, it is to be understood as being merely illustrative, and that various modifications can be made without departing from the spirit of the invention, or the scope thereof, as set forth in the following claims.

Having thus described the invention, what is claimed and desired to be secured by Letters Patent is:

1. In apparatus for applying rail anchors and of the type having a wheeled frame adapted to travel along the rail, the improvement that comprises means on said frame forming a pivotal support above a rail for a pair of anchor positioning arms, said arms being supported at their upper ends above the rail for swinging movement about a common axis parallel to the rail, the arms extending downward alongside the rail, hydraulic power means interconnected between said frame and arms for swinging the lower ends of the arms toward and away from the rail, said arms further being pivotally mounted adjacent their upper ends for swinging movement toward and away from one another, each arm having an anchor holder pivotally supported thereon and projecting generally toward the rail, each holder being shaped to carry an anchor at its projecting end, the anchor being moved by the positioning arm from a retracted position to the side and above the rail bottom to an advanced position beneath the rail bottom, second hydraulic power means interconnected between said anchor holders to move the holders and associated positioning arms toward and away from one another, and third hydraulic power means interconnected between the anchor holders and said positioning arms for rocking the holders on the arms toward and away from the bottom of the rail, and hydraulic control means for operating said first, second and third power means in sequence, whereby said first hydraulic power means positions the anchors beneath the rail, said second hydraulic power means positions the anchors against the sides of a cross tie and said third hydraulic power means then applies the anchors to the rail base.

2. Apparatus as set forth in claim 1, wherein each positioning arm further includes a movable support for the associated holder permitting limited movement of the holders toward and away from the pivotal axis for said arms, said holders further having aligning members cooperable with the rail to align the anchors vertically with the rail as they are swung inwardly therebeneath.

3. Apparatus as set forth in claim 1, further including a magazine containing a supply of anchors and mounted upon the frame with a part thereof extending alongside the anchor holder when in its retracted position to the side and above the rail bottom, and means on the magazine operative upon movement of the holder to its retracted position for feeding an anchor from said part of the magazine to the holder.

4. Apparatus as set forth in claim 1, further including a ballast plow pivotally mounted upon the anchor holder for limited rocking movement, said plow being biased upwardly relative to the rail, but permitting limited upward movement of the anchor and holder in the event a rock is caught between the plow and rail bottom.

References Cited in the file of this patent
UNITED STATES PATENTS
2,925,048  McWilliams et al. _____ Feb. 16, 1960

OTHER REFERENCES
"Railway Track and Structures," publication, February 1958, page 27 relied on.
Railway Age Magazine, Feb. 17, 1958, pages 20 and 21.

UNITED STATES PATENT OFFICE
CERTIFICATE OF CORRECTION

Patent No. 3,121,400                               February 18, 1964

Milton C. Giebel et al.

It is hereby certified that error appears in the above numbered patent requiring correction and that the said Letters Patent should read as corrected below.

Column 2, line 58, after "tie" insert -- 2 --; column 3, line 8, for "power 51" read -- power unit 51 --; column 4, line 12, for "provided" read --pivoted --; column 6, line 60, for "pocekt" read -- pocket --; column 7, line 16, for "If" read -- It --.

Signed and sealed this 30th day of June 1964.

(SEAL)
Attest:

ERNEST W. SWIDER                                        EDWARD J. BRENNER
Attesting Officer                                             Commissioner of Patents